United States Patent
Zheng et al.

(10) Patent No.: US 11,784,725 B2
(45) Date of Patent: Oct. 10, 2023

(54) SYSTEMS AND METHODS OF DYNAMIC SELECTION OF ANTENNAS FOR POWER OPTIMIZATION

(71) Applicant: Meta Platforms Technologies, LLC, Menlo Park, CA (US)

(72) Inventors: Dong Zheng, Saratoga, CA (US); Qi Qu, Redmond, WA (US); William Louis Abbott, Portola Valley, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 72 days.

(21) Appl. No.: 17/505,163

(22) Filed: Oct. 19, 2021

(65) Prior Publication Data

US 2022/0166526 A1      May 26, 2022

Related U.S. Application Data

(60) Provisional application No. 63/116,678, filed on Nov. 20, 2020.

(51) Int. Cl.
| | |
|---|---|
| *H04W 24/08* | (2009.01) |
| *H04B 17/10* | (2015.01) |
| *H04B 17/318* | (2015.01) |
| *H04B 7/08* | (2006.01) |
| *H04B 7/06* | (2006.01) |

(52) U.S. Cl.
CPC ......... *H04B 17/102* (2015.01); *H04B 7/0608* (2013.01); *H04B 7/0802* (2013.01); *H04B 17/318* (2015.01); *H04W 24/08* (2013.01)

(58) Field of Classification Search
None
See application file for complete search history.

(56) References Cited

U.S. PATENT DOCUMENTS

| | | | |
|---|---|---|---|
| 9,379,788 B2* | 6/2016 | Clevorn | H04B 7/0842 |
| 10,972,145 B1* | 4/2021 | Klomsdorf | H04B 1/48 |
| 10,985,617 B1* | 4/2021 | Johnston | H02J 50/90 |
| 2015/0010099 A1 | 1/2015 | Lin et al. | |
| 2015/0031294 A1* | 1/2015 | Holman | H04W 4/023 |
| | | | 455/41.2 |
| 2016/0191121 A1* | 6/2016 | Bell | H02J 50/402 |
| | | | 307/104 |

(Continued)

OTHER PUBLICATIONS

International Search Report and Written Opinion for International Application No. PCT/US2021/059295, dated Mar. 7, 2022, 9 pages.

*Primary Examiner* — Wilson Lee
(74) *Attorney, Agent, or Firm* — Foley & Lardner LLP

(57) ABSTRACT

Disclosed herein are systems, devices and methods related to a wireless communication. In one aspect, a device determines a first metric according to a first data rate and a first power consumption of communication through a first antenna of the device. In one aspect, the device determines a second metric according to a second data rate and a second power consumption of communication through the first antenna and a second antenna of the device. In one aspect, the device selects one or more of the first antenna and the second antenna for communication with another device, according to the first metric and the second metric. In one aspect, the device communicates through the one or more of the first antenna and the second antenna.

20 Claims, 7 Drawing Sheets

(56) References Cited

U.S. PATENT DOCUMENTS

| | | | |
|---|---|---|---|
| 2018/0048178 A1* | 2/2018 | Leabman | H04B 3/54 |
| 2019/0123786 A1* | 4/2019 | Lee | H04B 1/0067 |
| 2019/0239233 A1* | 8/2019 | Ryu | H04W 72/046 |
| 2020/0205087 A1* | 6/2020 | Hong | H04B 7/0691 |
| 2020/0244104 A1* | 7/2020 | Katajamaki | C07K 16/2896 |
| 2020/0295854 A1* | 9/2020 | Narra | H04B 17/327 |
| 2020/0358518 A1* | 11/2020 | Tarighat Mehrabani | H04B 7/15542 |
| 2021/0091816 A1* | 3/2021 | Noh | H04M 1/026 |
| 2022/0116089 A1* | 4/2022 | Khoryaev | H04B 7/0695 |

* cited by examiner

SYSTEMS AND METHODS OF DYNAMIC SELECTION OF ANTENNAS FOR POWER OPTIMIZATION

CROSS-REFERENCE TO RELATED APPLICATION

This application claims priority to U.S. Provisional Patent Application No. 63/116,678 filed on Nov. 20, 2020, which is incorporated by reference herein in its entirety.

FIELD OF DISCLOSURE

The present disclosure is generally related to communication antennas, including but not limited to systems and methods of reducing latency in communication for artificial reality.

BACKGROUND

Artificial reality such as a virtual reality (VR), an augmented reality (AR), or a mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space).

In one implementation, an image of a virtual object is generated by a console communicatively coupled to the HWD. In one example, the HWD includes various sensors that detect a location and/or orientation of the HWD, and transmits the detected location and/or orientation of the HWD to the console through a wired connection or a wireless connection. The console can determine a user's view of the space of the artificial reality according to the detected location and/or orientation of the HWD, and generate image data indicating an image of the space of the artificial reality corresponding to the user's view. The console can transmit the image data to the HWD, by which the image of the space of the artificial reality corresponding to the user's view can be presented to the user. In one aspect, the process of detecting the location of the HWD and the gaze direction of the user wearing the HWD, and rendering the image to the user should be performed within a frame time (e.g., less than 11 ms). Any latency between a movement of the user wearing the HWD and an image displayed corresponding to the user movement can cause judder, which may result in motion sickness and can degrade the user experience.

SUMMARY

Various embodiments disclosed herein are related to a device for wireless communication. In some embodiments, the device includes a first antenna, a second antenna, and one or more processors. In some embodiments, the one or more processor are configured to determine a first metric according to a first data rate and a first power consumption of communication through the first antenna. In some embodiments, the one or more processors are configured to determine a second metric according to a second data rate and a second power consumption of communication through the first antenna and the second antenna. In some embodiments, the one or more processors are configured to select one or more of the first antenna and the second antenna for communication with another device, according to the first metric and the second metric.

In some embodiments, the first metric is determined by dividing the first data rate by the first power consumption. In some embodiments, the second metric is determined by dividing the second data rate by the second power consumption. In some embodiments, the one or more processors are configured to compare the first metric and the second metric. The one or more processors can select the one or more of the first antenna and the second antenna for communication with the another device, to support a higher one of the first metric and the second metric.

In some embodiments, the one or more processors are configured to determine a third metric according to a third data rate and a third power consumption of communication through the second antenna, and select the one or more of the first antenna and the second antenna for communication with the another device, according to the first metric, the second metric, and the third metric. In some embodiments, the one or more processors are configured to compare the first metric, the second metric, and the third metric. The one or more processors can select the one or more of the first antenna and the second antenna for communication with the another device, to support a higher one of the first metric, the second metric, and the third metric.

In some embodiments, the one or more processors are configured to determine a first signal strength of a first signal communicated through the first antenna. In some embodiments, the one or more processors are configured to determine a second signal strength of a second signal communicated through the first antenna and the second antenna. In some embodiments, the one or more processors are configured to determine the first data rate according to the first signal strength. In some embodiments, the one or more processors are configured to determine the second data rate according to the second signal strength.

In some embodiments, the one or more processors are configured to determine a third signal strength of a third signal received through the second antenna. The one or more processors can select the first antenna and the second antenna for communication with the another device, in response to the first signal strength and the third signal strength being less than a threshold. In some embodiments, the one or more processors are configured to determine a third data rate according to the third signal strength. In some embodiments, the one or more processors are configured to determine a third metric according to the third data rate and a third power consumption of communication through the second antenna. In some embodiments, the one or more processors are configured to select the second antenna for communication with the another device, in response to i) the third signal strength being larger than the threshold and ii) the third metric being larger than the first metric and the second metric.

In some embodiments, the one or more processors are configured to determine a first received signal strength indicator of the first signal to determine the first signal strength. In some embodiments, the one or more processors are configured to determine a second received signal strength indicator of the second signal to determine the second signal strength. In some embodiments, the one or more processors are configured to determine a third received signal strength indicator of the third signal to determine the third signal strength. In some embodiments, the one or more processors are configured to subtract the second received signal strength indicator by an offset value to prioritize the first antenna over the second antenna.

In some embodiments, the device includes a transceiver, and a switch configured to selectively couple the one or more of the first antenna and the second antenna to the transceiver, according to an instruction from the one or more processors.

In some embodiments, the device includes a first transceiver and a second transceiver. In some embodiments, the one or more processors are configured to enable one or more of the first transceiver and the second transceiver to be coupled to the selected one or more of the first antenna and the second antenna for communication with the another device.

Various embodiments disclosed herein are related to a method for wireless communication. In some embodiments, the method includes determining, by a device, a first metric according to a first data rate and a first power consumption of communication through a first antenna of the device. In some embodiments, the method includes determining, by the device, a second metric according to a second data rate and a second power consumption of communication through the first antenna and a second antenna of the device. In some embodiments, the method includes selecting, by the device, one or more of the first antenna and the second antenna for communication with another device, according to the first metric and the second metric. In some embodiments, the method includes communicating, by the device, through the one or more of the first antenna and the second antenna.

In some embodiments, the method includes dividing the first data rate by the first power consumption to determine the first metric. In some embodiments, the method includes dividing the second data rate by the second power consumption to determine the second metric. In some embodiments, the method includes comparing, by the device, the first metric and the second metric. In some embodiments, the one or more of the first antenna and the second antenna for communication with the another device are selected, by the device, to support a higher one of the first metric and the second metric.

In some embodiments, the method includes determining, by the device, a third metric according to a third data rate and a third power consumption of communication through the second antenna. In some embodiments, the method includes comparing, by the device, the first metric, the second metric, and the third metric. In some embodiments, the one or more of the first antenna and the second antenna for communication with the another device are selected, by the device, to support a higher one of the first metric, the second metric, and the third metric.

In some embodiments, the method includes determining, by the device, a first signal strength of a first signal communicated through the first antenna. In some embodiments, the method includes determining, by the device, a second signal strength of a second signal communicated through the first antenna and the second antenna. In some embodiments, the method includes determining, by the device, the first data rate according to the first signal strength. In some embodiments, the method includes determining, by the device, the second data rate according to the second signal strength.

In some embodiments, the method includes determining, by the device, a third signal strength of a third signal received through the second antenna. In some embodiments, the method includes determining, by the device, a third data rate according to the third signal strength. In some embodiments, the method includes determining, by the device, a third metric according to the third data rate and a third power consumption of communication through the second antenna. In some embodiments, the method includes selecting, by the device, the first antenna and the second antenna for communication with the another device, in response to the first signal strength and the third signal strength being less than a threshold. In some embodiments, the method includes selecting, by the device, the second antenna for communication with the another device, in response to i) the third signal strength being larger than the threshold and ii) the third metric being larger than the first metric and the second metric.

Various embodiments disclosed herein are related to a non-transitory computer readable medium storing instructions for wireless communication. In some embodiments, the instructions when executed by one or more processors cause the one or more processors to determine a first metric according to a first data rate and a first power consumption of communication through a first antenna of a device. In some embodiments, the instructions when executed by the one or more processors cause the one or more processors to determine a second metric according to a second data rate and a second power consumption of communication through the first antenna and a second antenna of the device. In some embodiments, the instructions when executed by the one or more processors cause the one or more processors to select one or more of the first antenna and the second antenna for communication with another device, according to the first metric and the second metric. In some embodiments, the instructions when executed by the one or more processors cause the transceiver to communicate through the one or more of the first antenna and the second antenna.

In some embodiments, the non-transitory computer readable medium further stores instructions when executed by the one or more processors cause the one or more processors to divide the first data rate by the first power consumption to determine the first metric, and can cause the one or more processors divide the second data rate by the second power consumption to determine the second metric.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
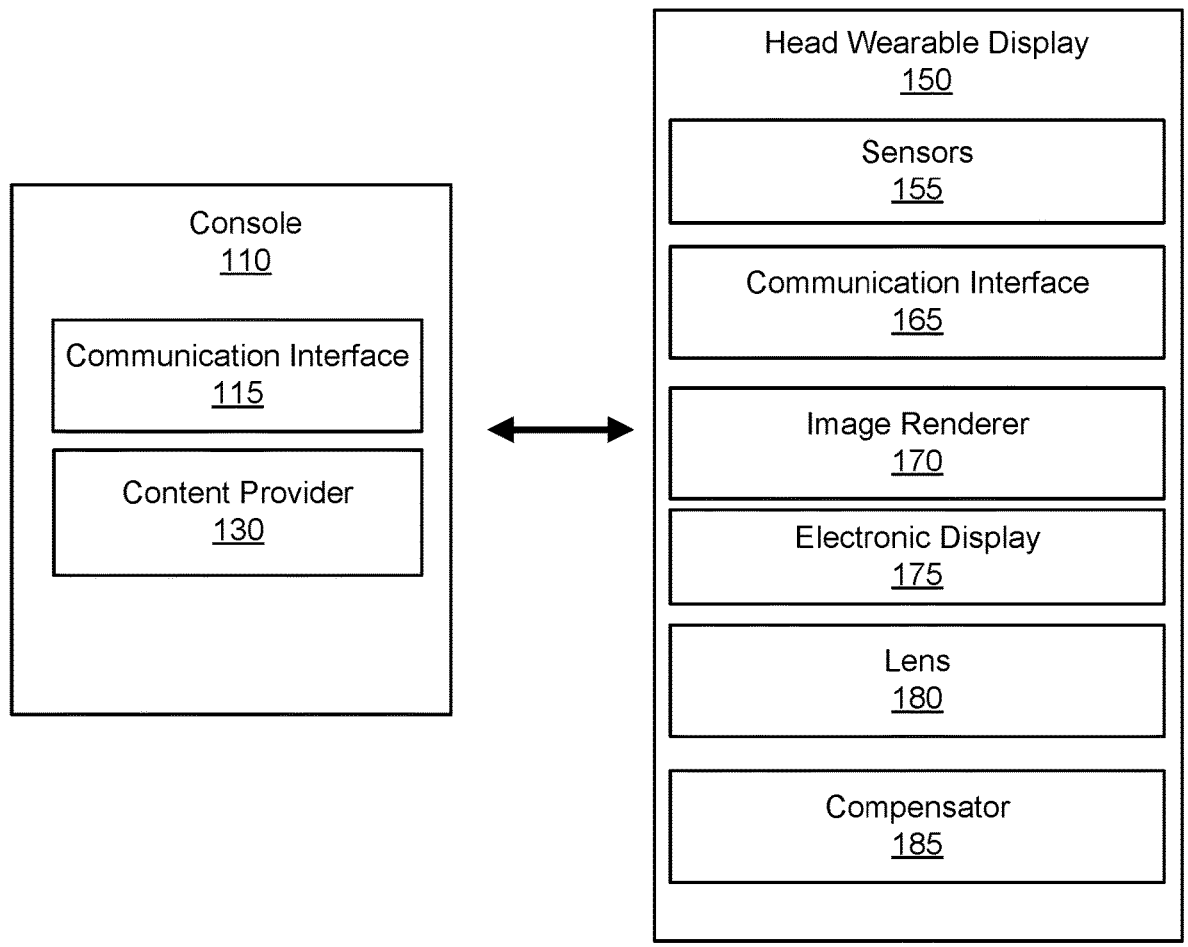
FIG. 1 is a diagram of a system environment including an artificial reality system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are related to systems and methods for wireless communication through one or more antennas in a power efficient manner. In one aspect, a device determines, for each of the one or more antennas, or any combination of the one or more antennas, a metric according to a data rate and a power consumption of communication. A metric of one or more antennas may indicate, represent, or correspond to a data rate per power consumption of communication through the one or more antennas. In one aspect, the device selects/activates/determines one or more antennas for communication with another device, by comparing the metrics. For example, the device may select a fewer number of antennas for communication, if communication through the fewer number of antennas can support a sufficient data rate (or a threshold/minimum data rate) and the communication through the fewer number of antennas is more power efficient (than with a higher number of antennas) according to comparison of metrics.

Advantageously, the disclosed system and method can be employed for remotely rendering an artificial reality space (e.g., an AR space, a VR space, or a MR space) in a power efficient manner. For example, a console (e.g., computing device) can generate image data indicating an image of the space of the artificial reality corresponding to the user's view, and transmit the image data to the HWD for presentation. However, a latency in a wireless communication between the console and the HWD may result in motion sickness and can degrade the user experience. Meanwhile, a user of the HWD may frequently move, and an antenna that provided a better communication quality than another antenna may no longer support a sufficient communication quality due to repositioning or movement of the user. Assuming for an example that a first antenna on a left side of the HWD provided a better communication quality than a second antenna on a right side of the HWD, a user may turn his head with respect to the console in a manner that an arm, a body, or the head may block a signal path between the console and the first antenna, thereby degrading the communication quality. When the degrading in the communication quality occurs, another antenna (e.g., second antenna) or multiple antennas may be selected to ensure sufficient communication quality. In one aspect, one or more (or a certain number of) antennas that allow or support a wireless communication with a sufficient data rate (e.g., 1 Mbps-100 Mbps) for artificial reality application and that achieve the highest power efficiency (e.g., highest ratio of data rate to power consumption) can be selected, rather than selecting/using/activating more (e.g., a higher number of) antennas for a higher data rate. Hence, a wireless communication with a data rate suitable for an artificial reality application can be provided with reduced latency, while extending a battery life of the HWD, the console or both.

Although some descriptions of systems and methods herein are provided with respect to wireless communication for artificial reality, the principle disclosed herein can be applied to any wireless device.

FIG. 1 is a block diagram of an example artificial reality system environment 100. In some embodiments, the artificial reality system environment 100 includes a HWD 150 worn by a user, and a console 110 providing content of artificial reality to the HWD 150. The HWD 150 may be referred to as, include, or be part of a head mounted display (HMD), head mounted device (HMD), head wearable device (HWD), head worn display (HWD) or head worn device (HWD). The HWD 150 may detect its location and/or orientation of the HWD 150 as well as a shape, location, and/or an orientation of the body/hand/face of the user, and provide the detected location/or orientation of the HWD 150 and/or tracking information indicating the shape, location, and/or orientation of the body/hand/face to the console 110. The console 110 may generate image data indicating an image of the artificial reality according to the detected location and/or orientation of the HWD 150, the detected shape, location and/or orientation of the body/hand/face of the user, and/or a user input for the artificial reality, and transmit the image data to the HWD 150 for presentation. In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HWD 150. For example, some of the functionality of the HWD 150 may be performed by the console 110. In some embodiments, the console 110 is integrated as part of the HWD 150.

In some embodiments, the HWD 150 is an electronic component that can be worn by a user and can present or provide an artificial reality experience to the user. The HWD 150 may render one or more images, video, audio, or some combination thereof to provide the artificial reality experience to the user. In some embodiments, audio is presented via an external device (e.g., speakers and/or headphones) that receives audio information from the HWD 150, the console 110, or both, and presents audio based on the audio information. In some embodiments, the HWD 150 includes sensors 155, a communication interface 165, an image renderer 170, an electronic display 175, a lens 180, and a compensator 185. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detect a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the sensors 155 include eye trackers that determine a gaze direction of the user of the HWD 150. The eye trackers may be embodied as electronic components, software components, or a combination of them. In some embodiments, the HWD 150, the console 110 or a combination of them may incorporate the gaze direction of the user of the HWD 150 to generate image data for artificial reality. In some embodiments, the eye trackers include two eye trackers, where each eye tracker captures an image of a corresponding eye and determines a gaze direction of the eye. In one example, the eye tracker determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation and the change in the torsion of the eye. In one approach, the eye tracker may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers incorporate the orientation of the HWD 150 and the relative gaze direction with respect to the HWD 150 to determine a gate direction of the user. Assuming for an example that the HWD 150 is oriented at a direction 30 degrees from a reference direction, and the relative gaze direction of the HWD 150 is −10 degrees (or 350 degrees) with respect to the HWD 150, the eye trackers may determine that the gaze direction of the user is 20 degrees from the reference direction. In some embodiments, a user of the HWD 150 can configure the HWD 150 (e.g., via user settings) to enable or disable the eye trackers. In some embodiments, a user of the HWD 150 is prompted to enable or disable the eye trackers.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link. Examples of the wireless link can include a cellular communication link, a near field communication link, Wi-Fi, Bluetooth, 60 GHz wireless link, or any communication wireless communication link. Through the communication link, the communication interface 165 may transmit to the console 110 data indicating the determined location and/or orientation of the HWD 150, the determined gaze direction of the user. Moreover, through the communication link, the communication interface 165 may receive from the console 110 image data indicating or corresponding to an image to be rendered and additional data associated with the image.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)) that executes instructions to perform various functions described herein. The image renderer 170 may receive, through the communication interface 165, image data describing an image of artificial reality to be rendered and additional data associated with the image, and render the image through the electronic display 175. In some embodiments, the image data from the console 110 may be encoded, and the image renderer 170 may decode the image data to render the image. In some embodiments, the image renderer 170 receives, from the console 110, additional data such as object information indicating virtual objects in the artificial reality space and depth information indicating depth (or distances from the HWD 150) of the virtual objects. In one aspect, according to the image of the artificial reality, object information, depth information from the console 110, and/or updated sensor measurements from the sensors 155, the image renderer 170 may perform shading, reprojection, and/or blending to update the image of the artificial reality to correspond to the updated location and/or orientation of the HWD 150. Assuming that a user rotated his head after the initial sensor measurements, rather than recreating the entire image responsive to the updated sensor measurements, the image renderer 170 may generate a small portion (e.g., 10%) of an image corresponding to an updated view within the artificial reality according to the updated sensor measurements, and append the portion to the image in the image data from the console 110 through reprojection. The image renderer 170 may perform shading and/or blending on the appended edges. Hence, without recreating the image of the artificial reality according to the updated sensor measurements, the image renderer 170 can generate the image of the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the compensator 185 includes an electronic component or a combination of an electronic component and a software component that performs compensation to compensate for any distortions or aberrations.

In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the image renderer 170 to compensate for the distortions caused by the lens 180, and apply the determined compensation to the image from the image renderer 170. The compensator 185 may provide the predistorted image to the electronic display 175.

In some embodiments, the console 110 is an electronic component or a combination of an electronic component and a software component that provides content to be rendered to the HWD 150. In one aspect, the console 110 includes a communication interface 115 and a content provider 130. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. In addition, these components may operate together to generate additional data associated with the image. Additional data may be information associated with presenting or rendering the artificial reality other than the image of the artificial reality. Examples of additional data include, mapping information for translating a location and an orientation of the HWD 150 in a physical space into a virtual space (or simultaneous localization and mapping (SLAM) data), eye tracking data, motion vector information, depth information, edge information, object information, etc. The console 110 may provide the image data and the additional data to the HWD 150 for presentation of the artificial reality. In other embodiments, the console 110 includes more, fewer, or different components than shown in FIG. 1. In some embodiments, the console 110 is integrated as part of the HWD 150.

In some embodiments, the communication interface 115 is an electronic component or a combination of an electronic component and a software component that communicates with the HWD 150. The communication interface 115 may be a counterpart component to the communication interface 165 to communicate with the communication interface 115 of the console 110 through a communication link (e.g., wireless link). Through the communication link, the communication interface 115 may receive from the HWD 150 data indicating the determined location and/or orientation of the HWD 150 and the determined gaze direction of the user. Moreover, through the communication link, the communication interface 115 may transmit to the HWD 150 image data describing an image to be rendered and additional data associated with the image of the artificial reality.

The content provider 130 can include or correspond to a component that generates content to be rendered according to the location and/or orientation of the HWD 150. In some embodiments, the content provider 130 may incorporate the gaze direction of the user of the HWD 150, and a user interaction in the artificial reality to generate the content to be rendered. In one aspect, the content provider 130 determines a view of the artificial reality according to the location and/or orientation of the HWD 150. For example, the content provider 130 maps the location of the HWD 150 in a physical space to a location within an artificial reality space, and determines a view of the artificial reality space along a direction corresponding to the mapped orientation from the mapped location in the artificial reality space. The content provider 130 may generate image data describing an image of the determined view of the artificial reality space, and transmit the image data to the HWD 150 through the communication interface 115. In some embodiments, the content provider 130 may generate additional data including motion vector information, depth information, edge information, object information, hand model data, etc., associated with the image, and transmit the additional data together with the image data to the HWD 150 through the communication interface 115. The content provider 130 may encode the image data describing the image, and can transmit the encoded data to the HWD 150. In some embodiments, the content provider 130 generates and provides the image data to the HWD 150 periodically (e.g., every 11 ms).

Figure 2A:
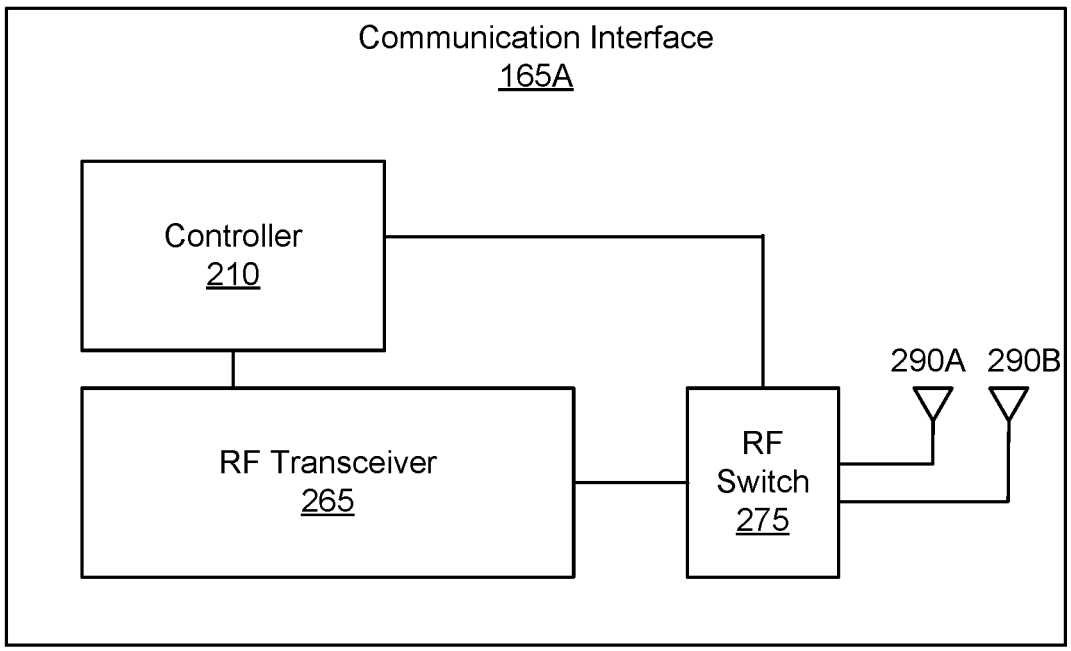
FIG. 2A is a diagram of a communication interface, according to an example implementation of the present disclosure.

FIG. 2A is a diagram of the communication interface 165A, according to an example implementation of the present disclosure. In some embodiments, the communication interface 165A includes a controller 210, a radio frequency (RF) transceiver 265, RF switch 275, and antennas 290A, 290B. In some embodiments, these components may operate together to select one or more of the antennas 290A, 290B, and communicate with the console 110. In some embodiments, the communication interface 165A includes more, fewer or different components than shown in FIG. 2A. For example, the communication interface 165A includes more antennas 290 than show in FIG. 2A.

In some embodiments, the controller 210 is or corresponds to a component that controls the RF transceiver 265 and/or the RF switch 275. In some embodiments, the controller 210 is embodied as hardware, software, or a combination of hardware and software. For example, the controller 210 may be implemented as one or more processors, application specific integrated circuit (ASIC), a field programmable gate array (FPGA). In some embodiments, the controller 210 is electrically or communicatively coupled to the RF transceiver 265 and the RF switch 275, for example, through conductive traces or wires. In this configuration, the controller 210 may generate signals or instructions to configure operations of the RF transceiver 265, the RF switch 275, or both.

In some embodiments, the RF transceiver 265 is or corresponds to a component that allows communication through a wireless channel. In some embodiments, the RF transceiver 265 includes a receiver and a transmitter. The transmitter may receive baseband data at a low frequency (e.g., less than 1 GHz), upconverts the baseband data to generate or obtain a RF transmit signal including the baseband data at a high frequency (e.g., 1 GHz~60 GHz). The transmitter may transmit the RF transmit signal through one or more selected antennas 290A, 290B. The receiver may receive a RF receive signal at a high frequency (e.g., 1 GHz~60 GHz) received through one or more antennas 290A, 290B, and downconverts the RF receive signal to generate or obtain baseband data.

In one example, the transmitter may receive sensor measurement data indicating a location and/or orientation of HWD 150 from the sensors 155. The transmitter may upconvert the sensor measurement data to generate an RF transmit signal including the sensor measurement data, and transmit the RF transmit signal through one or more selected antennas 290A, 290B. In one example, the receiver may receive, an RF receive signal including image data. The image data may include data for an image or a portion of the image of a view of artificial reality corresponding to the location and/or orientation of the HWD 150. The receiver may downconvert the RF receive signal to extract or obtain the image data as baseband data. The receiver may provide the image data to the image renderer 170 for rendering.

In some embodiments, the RF switch 275 is a component that electrically couples or decouples (e.g., selects/activates or deselects/deactivates) one or more antennas 290A, 290B to the RF transceiver 265, selectively. The RF switch 275 may receive a signal or an instruction from the controller 210, and can electrically couple one or more antennas 290A, 290B as indicated by the signal to the RF transceiver 265. For example, if the signal indicates the antenna 290A is selected but the antenna 290B is not, then the RF switch 275 may electrically couple the antenna 290A to the RF transceiver 265 while electrically decoupling the antenna 290B from the RF transceiver 265. For example, if the signal indicates both antennas 290A, 290B are selected, then the RF switch 275 may electrically couple the antennas 290A, 290B to the RF transceiver 265 simultaneously.

In some embodiments, the antennas 290A, 290B are components receiving or transmitting RF signals. Each antenna 290 may be a monopole antenna, a dipole antenna, a loop antenna, a spiral antenna, a patch antenna, or any suitable antenna for transmitting or receiving RF signals. Each antenna 290 may have a small form factor, such that each antenna may be coupled to or embedded within a body of the HWD 150. In some embodiments, the antennas 290A, 290B have the same shapes, dimensions and/or configurations. In some embodiments, the antennas 290A, 290B may have different shapes, dimensions and/or configurations, such that each antenna 290 may be tuned for a corresponding frequency band for example.

In some embodiments, the controller 210 may determine metrics of the antennas 290A, 290B to select one or more antennas for communication. The controller 210 may determine/calculate/compute/estimate metrics of the antennas 290A, 290B periodically (e.g., every 100 ms) or in response to detecting reduced communication quality (e.g., lower signal strength or lower data rate). A metric of an antenna 290 may correspond to (or be based on) a data rate and a power consumption of communication through the antenna 290. A metric of one or more antennas may indicate, represent, or correspond to a data rate per power consumption (or a ratio of data rate to power consumption) of communication (e.g., communicating signals) through the one or more antennas. In one approach, the controller 210 may cause the RF transceiver 265 to transmit an instruction to cause another device (e.g., console 110) to transmit a test signal. The controller 210 may select an antenna 290 for testing by providing a signal or an instruction to configure the RF switch 275. The controller 210 may cause the RF transceiver 265 to receive the test signal through the selected antenna, while disabling an unselected antenna 290. The controller 210 may determine a signal strength of the received test signal, for example, as a received signal strength indicator (RSSI). The controller 210 may determine or predict a data rate of transmission through the selected antenna, according to the determined signal strength. The controller 210 may also determine or predict a power consumption of transmission through the selected antenna at the determined or predicted data rate. In one example, the controller 210 may store a look up table indicating different power consumptions (e.g., actual power consumptions, or normalized power consumption, such as normalized using data rate) for corresponding data rates. The controller 210 may refer to the look up table to determine the power consumption for the corresponding data rate. The controller 210 may determine a metric for the selected antenna for testing by dividing the data rate by the power consumption (or vice versa). The controller 210 may repeat the process for the other antenna 290B by selecting the antenna 290B and unselecting the antenna 290A to determine the metric for the antenna 290B. The controller 210 may also repeat the process for the antennas 290A, 290B jointly by selecting/activating/using both antennas 290A, 290B simultaneously to determine the metric for the antennas 290A, 290B jointly.

In some embodiments, the controller 210 may select one or more of the antennas 290A, 290B, according to the metrics. In one approach, the controller 210 determines if a data rate of the antenna 290A or a data rate of the antenna 290B is above a threshold value. The threshold value may be a data rate sufficient to support an application for artificial reality (e.g., transmitting sensor measurement data or receiving image data). If the data rate of the antenna 290A and the data rate of the antenna 290B are both less than the threshold value, then the controller 210 may select both antennas 290A, 290B jointly for communication. If any of the data rate of the antenna 290A and the data rate of the antenna 290B is larger than the threshold value, then the controller 210 may compare i) a metric of the antenna 290 with a larger metric (or a larger data rate), and ii) a joint metric of two antennas 290A, 290B. For example, if the antenna 290A has a higher metric than a metric of the antenna 290B, the controller 210 may compare the metric of the antenna 290A with the joint metric of two antennas 290A, 290B. If the metric of one antenna 290A is higher than the metric of the antenna 290B and the metric of one antenna 290A is higher than the joint metric of two antennas 290A, 290B, the controller 210 may select the antenna 290A for communication. If the metric of one antenna 290A is higher than the metric of the antenna 290B and the metric of one antenna 290A is lower than the joint metric of two antennas 290A, 290B, the controller 210 may select two antennas 290A, 290B for communication.

In some embodiments, the controller 210 selects one or more antennas 290A, 290B for a unilateral communication. For example, the controller 210 may select one or more antennas 290A, 290B for transmitting data by comparing metric as discussed above, but select/use two antennas 290A, 290B simultaneously or jointly for receiving/transmitting data. In one aspect, the RF transceiver 265 consumes more power for transmitting data than receiving data. By selectively choosing one or more antennas 290A, 290B for transmission (or reception), power savings of the HWD 150 can be achieved. Meanwhile, utilizing both antennas 290A, 290B for receiving data can help improve sensitivity. In some embodiments, the controller 210 selects one or more antennas 290A, 290B for both transmitting and receiving data.

In some embodiments, the controller 210 selects an antenna for communication by comparing 2*min(MCS1, MCS2)/Power(2tx) with max(MCS1, MCS2)/Power(1tx). In one aspect, MCS1 is or corresponds to a data rate of communication through the antenna 290A; MCS2 is or corresponds to a data rate of communication through the antenna 290B; 2*min(MCS1, MCS2) is or corresponds to a data rate of communication through the antennas 290A, 290B jointly; Power(1tx) corresponds to a power consumption of communication through a single antenna 290; and Power(2tx) corresponds to a power consumption of communication through both antennas 290A, 290B jointly.

In some embodiments, the controller 210 adjusts or modifies values of the determined signal strengths (or RSSIs) to avoid or reduce frequent switching of antennas 290A, 290B. In one approach, the controller 210 may subtract/adjust the RSSI of an antenna 290 (e.g., antenna 290B) by an offset value (e.g., 10 dB) to prioritize another antenna 290 (e.g., antenna 290A). The offset value may be predetermined or adjustable. In one approach, the controller 210 may accumulate the signal strengths over a predetermined time period (e.g., 100 ms) according to the following equation:

$$RSSI(n+1) = \alpha * RSSI(n) + (1-\alpha) * \text{measured RSSI},$$

where measured RSSI is a measured value of RSSI; RSSI(n) is previously accumulated RSSI value; RSSI(n+1) is updated RSSI accumulating the measured RSSI; and α is a coefficient between 0 and 1 corresponding to the effectiveness of RSSI(n). α may be predetermined or adjustable. By offsetting RSSI for an antenna and/or accumulating RSSI, frequent switching of antennas 290A, 290B can be prevented.

In some embodiments, the controller 210 selects two antennas 290A, 290B when transitioning from one antenna to another antenna. Assuming for an example that the controller 210 decided to switch from the antenna 290A to the antenna 290B, for example, in response to detecting the reduced signal quality of communication through the antenna 290A, the controller 210 may select/activate both antennas 290A, 290B jointly during the transition (e.g., during at least part of the transition period) from the antenna 290A to the antenna 290B. Selecting two antennas 290A, 290B when transitioning from one antenna 290 (e.g., antenna 290A) to another antenna 290 (e.g., antenna 290B) can ensure that a sufficient data rate is provided and prevent any drop in communication due to directly switching from the one antenna 290 to the another antenna 290.

Figure 2B:
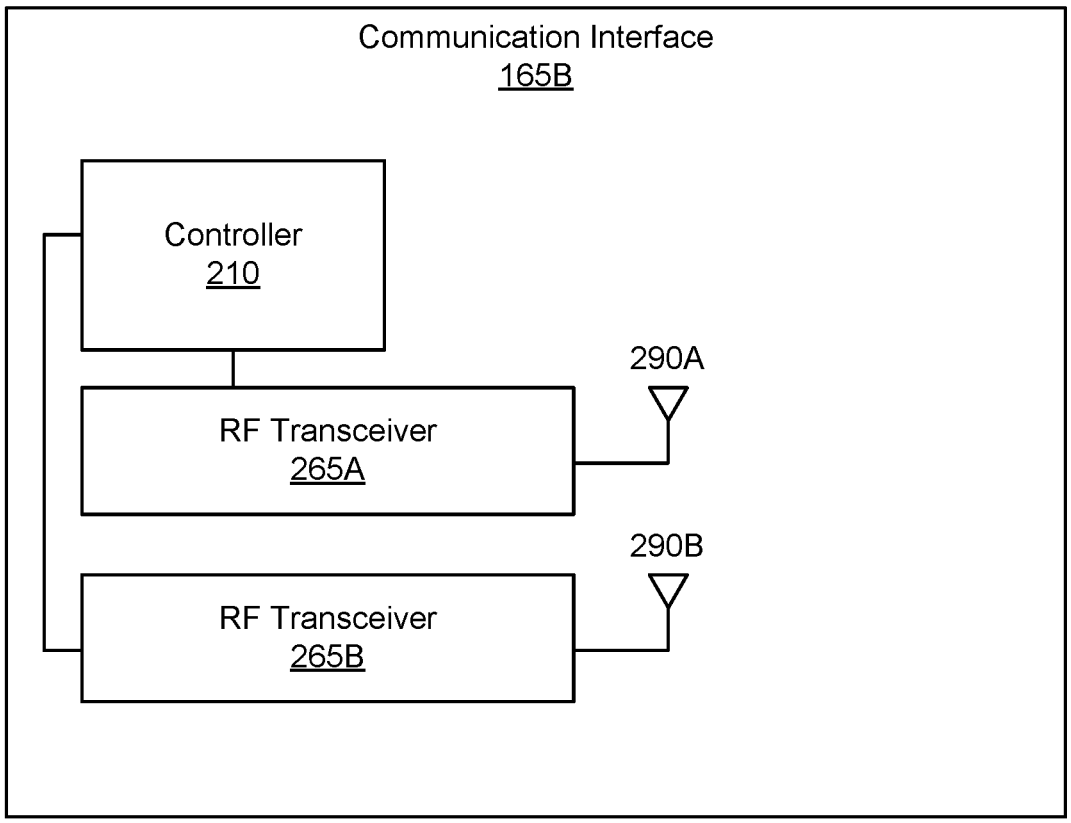
FIG. 2B is a diagram of a communication interface, according to an example implementation of the present disclosure.

FIG. 2B is a diagram of a communication interface 165B, according to an example implementation of the present disclosure. The configuration and operation of the communication interface 165B are similar to the communication interface 165A, except the communication interface 165B includes two RF transceivers 265A, 265B, and does not include the RF switch 275. Thus, detailed description of duplicated portion is omitted herein for the sake of brevity. In some embodiments, the antennas 290A, 290B are directly coupled to the RF transceivers 265A, 265B, respectively. In one approach, to enable a communication through or determining a metric of a selected antenna 290, the controller 210 may enable the RF transceiver 265 coupled to the selected antenna 290 while disabling the RF transceiver 265 coupled to the unselected antenna 290. By implementing, for each antenna 290, a corresponding RF transceiver 265, the antenna 290 and the corresponding transceiver 265 can be disposed in a close proximity (e.g., less than 1 inch), such that interference through a transmission line or a trace between the antenna 290 and the transceiver 265 can be reduced. By enabling or disabling RF transceiver(s) and their power consumption, the overall power consumption (and data rate per power consumption) associated with corresponding antenna(s) can affect the metric(s), so as to affect the determination of which antenna(s) (and RF transceiver(s)) to select/use/activate for communication, similar to the earlier discussions.

Figure 3A:
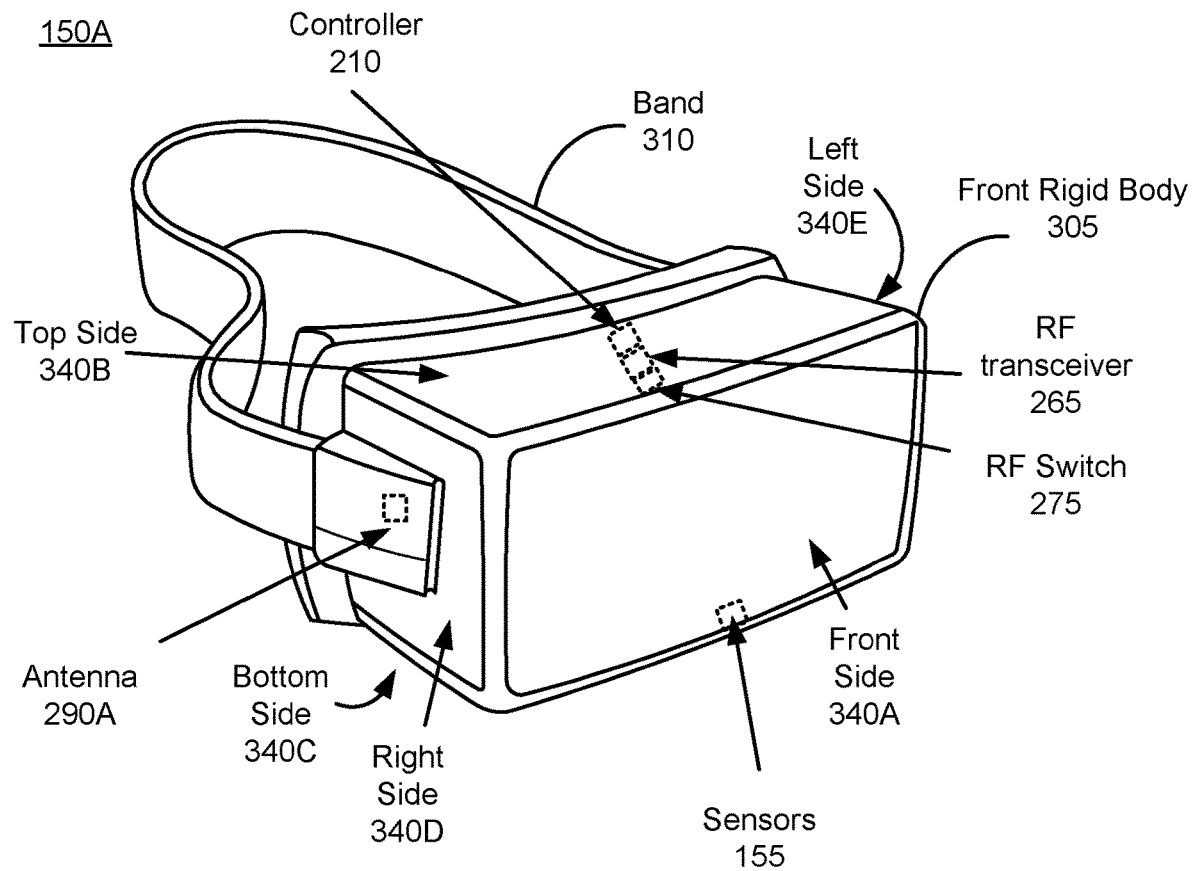
FIG. 3A is a diagram of a head wearable display, according to an example implementation of the present disclosure.

FIG. 3A is a diagram of a HWD 150A, in accordance with an example embodiment. In some embodiments, the HWD 150A includes a front rigid body 305 and a band 310. The front rigid body 305 includes the electronic display 175 (not shown in FIG. 3), the lens 180 (not shown in FIG. 3), the sensors 155, and the image renderer 170 (not shown in FIG. 3). In addition, the front rigid body 305 may include the controller 210, the RF transceiver 265, the RF switch 275, and antennas 290A, 290B. In some embodiments, the controller 210, the RF transceiver 265, and the RF switch 275 are disposed on a top side 340B of the front rigid body 305. In some embodiments, the antenna 290A is disposed on a right side 340D of the front rigid body 305, and the antenna 290B (not shown in FIG. 3A) is disposed on a left side 340E of the front rigid body 305. The controller 210, the RF transceiver 265, the RF switch 275, and the antennas 290A, 290B may be hidden inside a garment of the front rigid body 305, and may not be visible externally. In other embodiments, the HWD 150A has a different configuration than shown in FIG. 3A. For example, the communication interface 165, the image renderer 170, the sensors 155, the controller 210, the RF transceiver 265, the RF switch 275, the antennas 290A, 290B or any combination of them may be in different locations than shown in FIG. 3A.

Figure 3B:
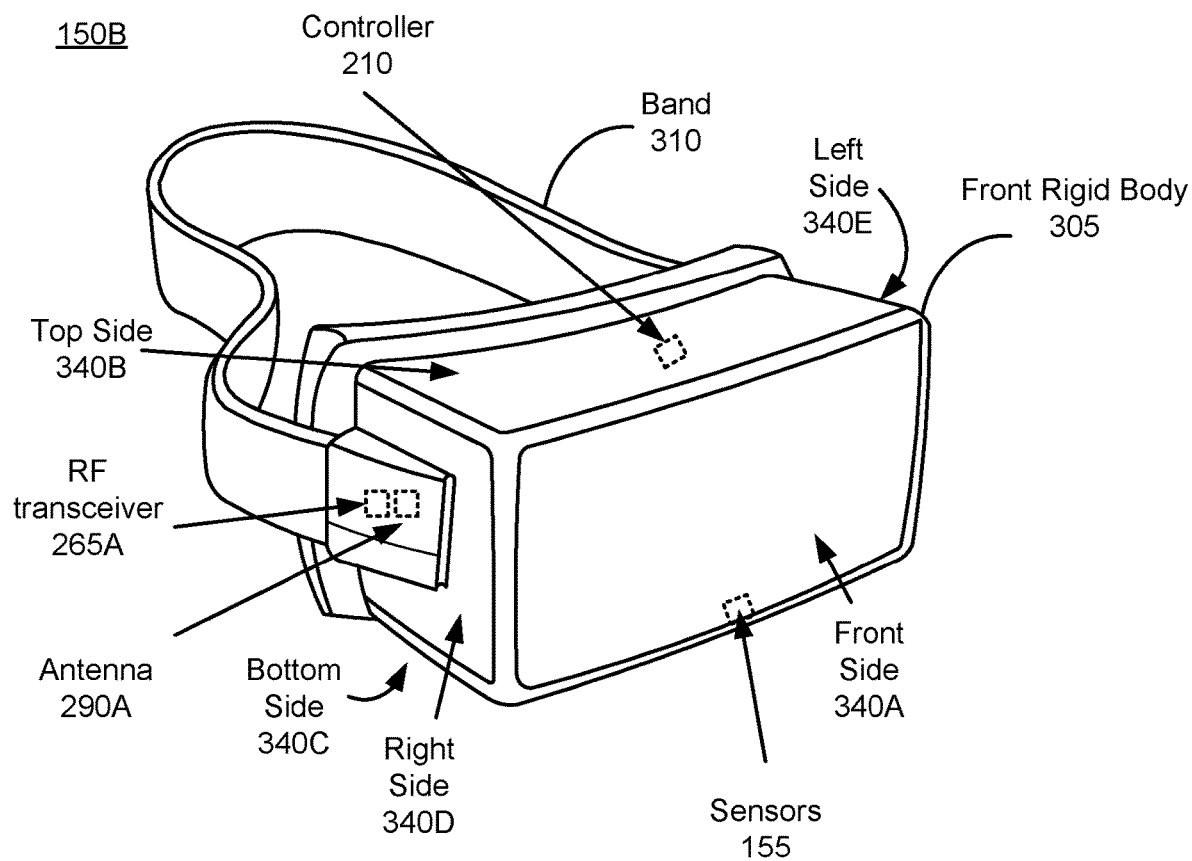
FIG. 3B is a diagram of a head wearable display, according to an example implementation of the present disclosure.

FIG. 3B is a diagram of a HWD 150B, in accordance with an example embodiment. In some embodiments, the HWD 150B is similar to the HWD 150A of FIG. 3A, except the HWD 150B includes i) the RF transceiver 265A disposed on the right side 340D of the HWD 150B, and ii) the RF transceiver 265B (not shown in FIG. 3B) disposed on the left side 340E of the HWD 150B without the RF transceiver 265 and the RF switch 275 on the top side 340B of the front rigid body 305. Thus, detailed description of duplicated portion thereof is omitted herein for the sake of brevity.

Figure 4:
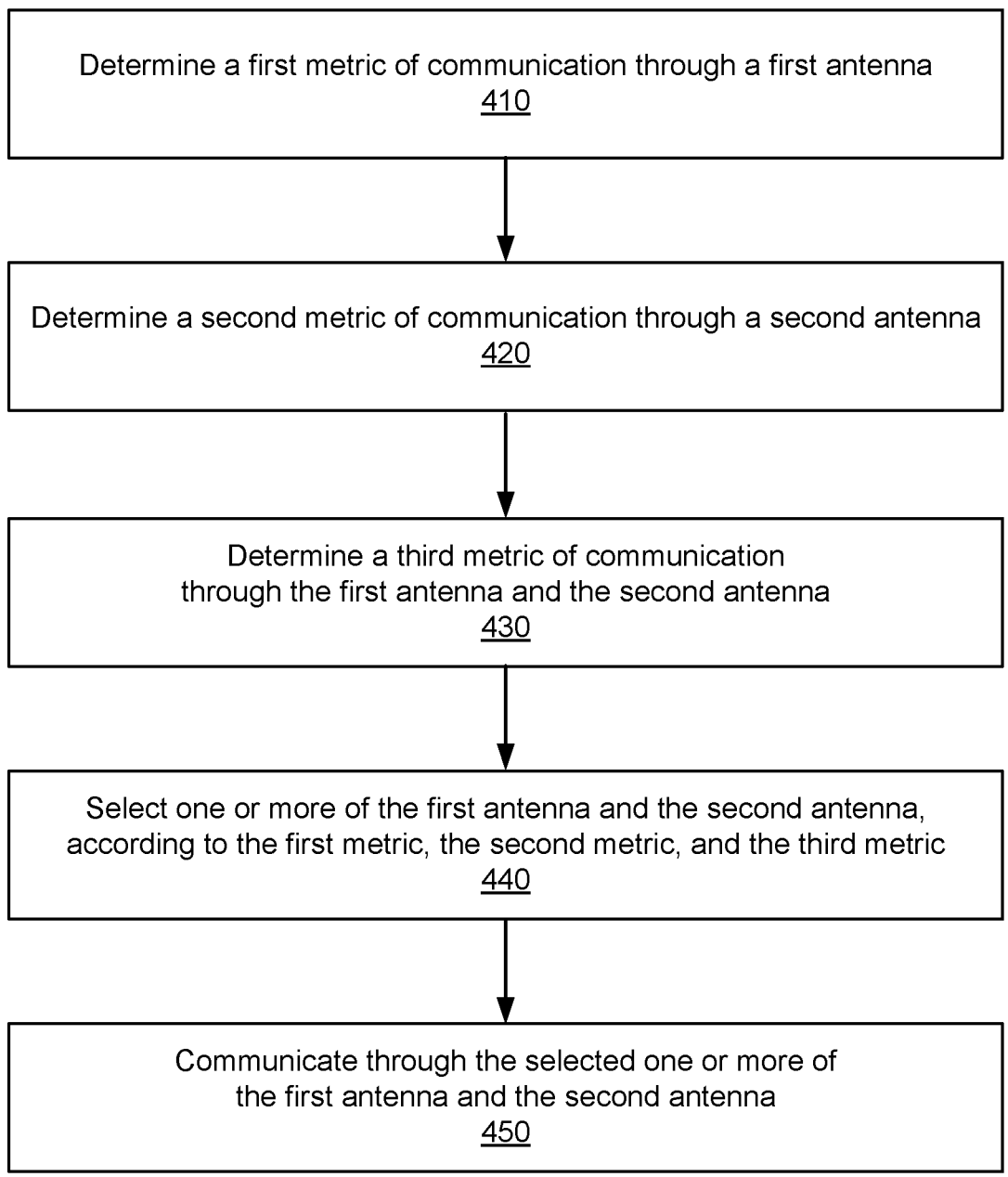
FIG. 4 is a flowchart showing a process of communicating through one or more antennas, according to an example implementation of the present disclosure.

FIG. 4 is a flowchart showing a process 400 of communicating through one or more antennas 290, according to an example implementation of the present disclosure. In some embodiments, the process 400 is performed by the HWD 150. In some embodiments, the process 400 is performed by a different device (e.g., the console 110, or any mobile device). In some embodiments, the process 400 includes more, fewer, or different steps than shown in FIG. 4.

In one approach, the HWD 150 determines 410 (e.g., calculates, estimates) a first metric of communication through a first antenna 290A. The HWD 150 may determine the first metric of the first antenna 290A periodically (e.g., every 100 ms) or in response to detecting reduced communication quality (e.g., lower signal strength or lower data rate) through any of the antennas 290A, 290B or both. The first metric of the first antenna 290A may correspond to (e.g., be determined according to) a data rate and a power consumption of communication through the first antenna 290A. In one approach, the HWD 150 may transmit an instruction to cause another device (e.g., console 110) to transmit a test signal. The HWD 150 may select the first antenna 290A for testing, and may determine a signal strength of the received test signal, for example, as a RSSI (or RSRP, etc.). According to the determined signal strength, the HWD 150 may determine or predict a data rate of transmission through the first antenna 290A. The HWD 150 may also determine or predict a power consumption of transmission through the first antenna 290A at the determined or predicted data rate. The HWD 150 may determine the first metric by dividing the data rate by the power consumption (or vice versa), or taking a ratio of the data rate and the power consumption.

In one approach, the HWD 150 determines 420 a second metric of communication through a second antenna 290B. The HWD 150 may determine the second metric, when or in response to determining the first metric. The second metric of the second antenna 290B may correspond to a data rate and a power consumption of communication through the second antenna 290B. The HWD 150 may determine the second metric in a similar manner as determining the first metric. In one approach, the HWD 150 may transmit an instruction to cause another device (e.g., console 110) to transmit a test (or measurement) signal. The HWD 150 may select the second antenna 290B for testing (or measurement), and may determine a signal strength of the received test signal, for example, as a RSSI. According to the determined signal strength, the HWD 150 may determine or predict a data rate of transmission through the second antenna 290B. The HWD 150 may also determine or predict a power consumption of transmission through the second antenna 290B at the determined or predicted data rate. The HWD 150 may determine the second metric for testing by dividing the data rate by the power consumption.

In one approach, the HWD 150 determines 430 a third metric of communication through (both) the first antenna 290A and the second antenna 290B. The HWD 150 may determine the third metric, when or in response to determining the first metric and the second metric. The third metric of the first antenna 290A and the second antenna 290B may correspond to a data rate and a power consumption of communication through the first antenna 290A and the second antenna 290B simultaneously or jointly. The HWD 150 may determine the second metric in a similar manner as determining the first metric or the second metric. In one approach, the HWD 150 may transmit an instruction to cause another device (e.g., console 110) to transmit a test signal. The HWD 150 may select the first antenna 290A and the second antenna 290B for testing, and may determine a signal strength of the received test signal, for example, as a RSSI. According to the determined signal strength, the HWD 150 may determine or predict a data rate of transmission through the first antenna 290A and the second antenna 290B. The HWD 150 may also determine or predict a power consumption of transmission through the first antenna 290A and the second antenna 290B at the determined or predicted data rate. The HWD 150 may determine the third metric for testing by dividing the data rate by the power consumption.

In some embodiments, the HWD 150 may utilize data rates or power consumptions determined in the steps 410, 420 to determine the third metric. For example, the HWD 150 may determine a lower data rate of the data rates determined in the steps 410, 420 and may determine the lower data rate multiplied by two as the data rate of communication through the first antenna 290A and the second antenna 290B. For example, the HWD 150 may add or sum the power consumptions determined in steps 410, 420 as the power consumption of communication through the first antenna 290A and the second antenna 290B. The HWD 150 may determine the third metric for testing by dividing the data rate by the power consumption. By utilizing measurements obtained in the steps 410, 420, the HWD 150 may avoid an additional testing or measurement(s) for the joint operation of the antennas 290A, 290B, such that the third metric can be determined with reduced delay and without consuming additional resources (e.g., power).

In one approach, the HWD 150 selects 440 one or more of the first antenna 290A and the second antenna 290B, according to the first metric, the second metric, and the third metric. For example, the HWD 150 may select 440 one or more of the first antenna 290A and the second antenna 290B corresponding to the highest metric. Example process of selecting one or more antennas 290A, 290B based on the metrics is provided below with respect to FIG. 5.

In one approach, the HWD 150 communicates 450 through the selected one or more of the first antenna 290A and the second antenna 290B. If the HWD 150 includes one RF transceiver 285 with the RF switch 275 coupled between the antennas 290A, 290B and the RF transceiver 265, for example, as shown in FIGS. 2A and 3A, the controller 210 may generate or provide a signal or instruction to cause the RF switch 275 to electrically couple the selected one or more antennas 290A, 290B to the RF transceiver 265 and cause the RF transceiver 265 to perform communication through the selected one or more antennas 290A, 290B. The RF switch 275 may electrically decouple an unselected antenna 290 from the RF transceiver 265. If the HWD 150 includes two RF transceivers 265A, 265B directly coupled to the antennas 290A, 290B, respectively, for example, as shown in FIGS. 2B and 3B, the controller 210 may generate or provide a signal or instruction to enable one or more RF transceivers 265A, 265B coupled to the one or more selected antennas 290A, 290B for communication. The controller 210 may generate or provide a signal or instruction to disable one or more RF transceivers 265A, 265B coupled to one or more unselected antennas 290A, 290B. Thus, the HWD 150 may communicate with the console 110 through one or more selected antennas 290A, 290B.

Advantageously, the HWD 150 may achieve power savings by selecting one or more antennas based on metrics as discussed above. In one aspect, communication through a single antenna 290 (or a lower number of antennas 290) can render a lower power consumption than communication through two antennas 290. For example, in the case as shown in FIGS. 2A and 3A, the RF transceiver 265 may transmit through a selected antenna 290 (e.g., antenna 290A) rather than two antennas 290 (e.g., antennas 290A, 290b), if the communication through the selected antenna 290 can support a sufficient data rate, and the RF transceiver 265 driving a single antenna 290 (or a fewer number of antennas) may be more power efficient than driving two antennas 290. For example, in the case as shown in FIGS. 2B and 3B, a RF transceiver 265 (e.g., RF transceiver 265A) coupled to the selected antenna 290 (e.g., antenna 290A) may be enabled for communication, if the communication through the selected antenna 290 can support a sufficient data rate (e.g., a minimum or threshold data rate), while the RF transceiver 265 (e.g., RF transceiver 265B) coupled to the unselected antenna 290 (e.g., antenna 290B) can be disabled. By disabling the RF transceiver 265 coupled to the unselected antenna 290, power efficiency can be achieved.

Figure 5:
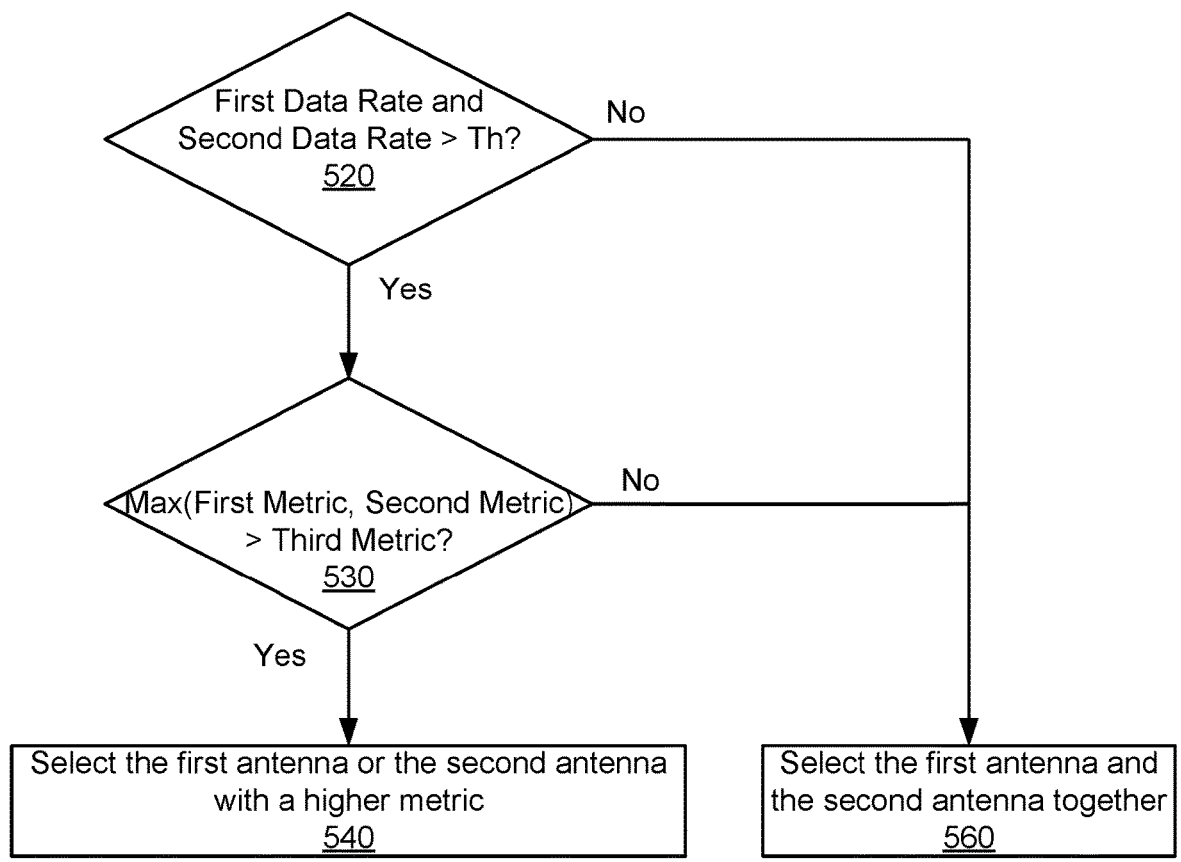
FIG. 5 is a flowchart showing a process of selecting one or more antennas for communication, according to an example implementation of the present disclosure.

FIG. 5 is a flowchart showing a process 500 of selecting one or more antennas 290 for communication, according to an example implementation of the present disclosure. The process 500 may be performed as (or as the part of) the step 440 in FIG. 4. In some embodiments, the process 500 is performed by the HWD 150. In some embodiments, the process 500 is performed by a different device (e.g., the console 110, or any mobile device). In some embodiments, the process 500 includes more, fewer, or different steps than shown in FIG. 5.

In one approach, the HWD 210 determines 520 if a data rate of communication through the antenna 290A or a data rate of communication through the antenna 290B is above a threshold data rate. The threshold data rate may be a data rate sufficient to support a certain application, such as an application for artificial reality (e.g., transmitting sensor measurement data or receiving image data). The threshold data rate may be predetermined or adjustable. In some embodiments, the HWD 210 may compare the signal strengths (or RSSIs) of antennas 290A, 290B against a threshold signal strength, instead of comparing the data rates against the threshold data rate.

If the data rate of communication through the antenna 290A and the data rate of communication through the antenna 290B are both/each less than the threshold value, then the HWD 210 may select 560 both antennas 290A, 290B jointly. If any of the data rate of communication through the antenna 290A and the data rate of communication through the antenna 290B is larger than the threshold value, then the HWD 210 may compare 530 i) a metric of the antenna 290 with a larger metric (or a larger data rate), and ii) a joint metric of two antennas 290A, 290B. For example, if the antenna 290A has a first metric higher than a second metric of the antenna 290B, the HWD 210 may compare the first metric of the antenna 290A with a third metric of two antennas 290A, 290B jointly. If the first metric of the antenna 290A is higher than the second metric of the antenna 290B and the first metric of the antenna 290A is higher than the third metric of two antennas 290A, 290B jointly, the HWD 210 may select 540 the antenna 290A with the higher metric for communication. If the first metric of the antenna 290A is higher than the second metric of the antenna 290B and the first metric of the antenna 290A is lower than the third metric of the two antennas 290A, 290B jointly, the HWD 210 may select 560 the two antennas 290A, 290B for communication.

Figure 6:
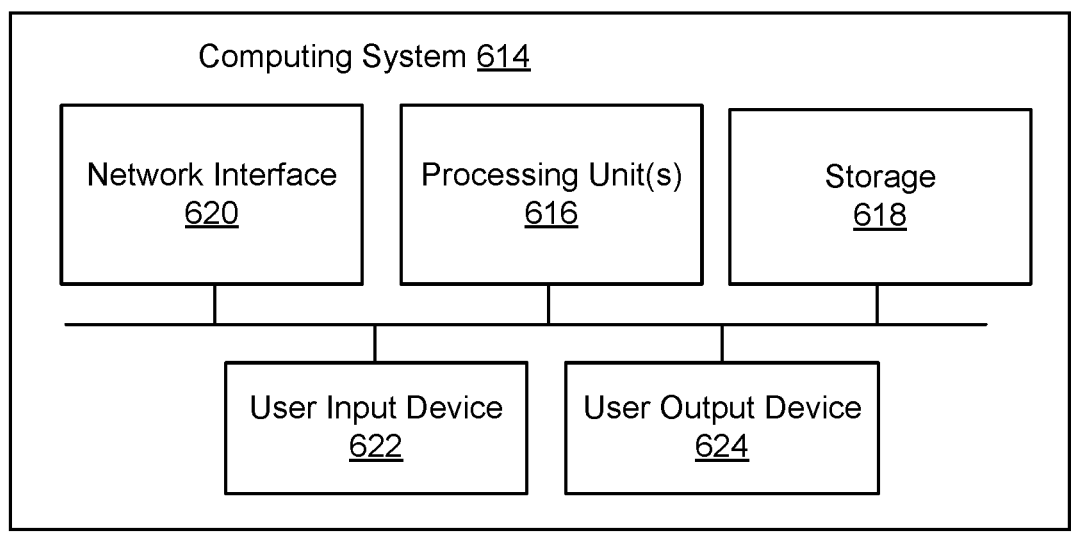
FIG. 6 is a block diagram of a computing environment according to an example implementation of the present disclosure.

Various operations described herein can be implemented on computer systems. FIG. 6 shows a block diagram of a representative computing system 614 usable to implement the present disclosure. In some embodiments, the console 110, the HWD 150 or both of FIG. 1 are implemented by the computing system 614. Computing system 614 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 614 can be implemented to provide VR, AR, MR experience. In some embodiments, the computing system 614 can include conventional computer components such as processors 616, storage device 618, network interface 620, user input device 622, and user output device 624.

Network interface 620 can provide a connection to a wide area network (e.g., the Internet) to which WAN interface of a remote server system is also connected. Network interface 620 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 622 can include any device (or devices) via which a user can provide signals to computing system 614; computing system 614 can interpret the signals as indicative of particular user requests or information. User input device 622 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 624 can include any device via which computing system 614 can provide information to a user. For example, user output device 624 can include a display to display images generated by or delivered to computing system 614. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 624 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 616 can provide various functionality for computing system 614, including any of the functionality described herein as being performed by a server or client, or other functionality associated with message management services.

It will be appreciated that computing system 614 is illustrative and that variations and modifications are possible. Computer systems used in connection with the present disclosure can have other capabilities not specifically described here. Further, while computing system 614 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A device comprising:
a first antenna;
a second antenna; and
one or more processors configured to:
determine a first metric according to a first data rate and a first power consumption of communication through the first antenna,
determine a second metric according to a second data rate and a second power consumption of communication through the first antenna and the second antenna, and
select one or more of the first antenna and the second antenna for communication with another device, according to the first metric and the second metric.

2. The device of claim 1, wherein:
the first metric is determined by dividing the first data rate by the first power consumption, and
the second metric is determined by dividing the second data rate by the second power consumption.

3. The device of claim 1, wherein the one or more processors are configured to:
compare the first metric and the second metric, and
select the one or more of the first antenna and the second antenna for communication with the another device, to support a higher one of the first metric and the second metric.

4. The device of claim 1, wherein the one or more processors are configured to:
determine a third metric according to a third data rate and a third power consumption of communication through the second antenna, and
select the one or more of the first antenna and the second antenna for communication with the another device, according to the first metric, the second metric, and the third metric.

5. The device of claim 4, wherein the one or more processors are configured to:
compare the first metric, the second metric, and the third metric, and
select the one or more of the first antenna and the second antenna for communication with the another device, to support a higher one of the first metric, the second metric, and the third metric.

6. The device of claim 1, wherein the one or more processors are configured to:
determine a first signal strength of a first signal communicated through the first antenna,
determine a second signal strength of a second signal communicated through the first antenna and the second antenna,
determine the first data rate according to the first signal strength, and
determine the second data rate according to the second signal strength.

7. The device of claim 6, wherein the one or more processors are configured to:

determine a third signal strength of a third signal received through the second antenna, and
select the first antenna and the second antenna for communication with the another device, in response to the first signal strength and the third signal strength being less than a threshold.

8. The device of claim 7, wherein the one or more processors are configured to:
determine a third data rate according to the third signal strength,
determine a third metric according to the third data rate and a third power consumption of communication through the second antenna, and
select the second antenna for communication with the another device, in response to i) the third signal strength being larger than the threshold and ii) the third metric being larger than the first metric and the second metric.

9. The device of claim 7, wherein the one or more processors are configured to:
determine a first received signal strength indicator of the first signal to determine the first signal strength,
determine a second received signal strength indicator of the second signal to determine the second signal strength, and
determine a third received signal strength indicator of the third signal to determine the third signal strength.

10. The device of claim 9, wherein the one or more processors are configured to:
subtract the second received signal strength indicator by an offset value to prioritize the first antenna over the second antenna.

11. The device of claim 1, further comprising:
a transceiver; and
a switch configured to selectively couple the one or more of the first antenna and the second antenna to the transceiver, according to an instruction from the one or more processors.

12. The device of claim 1, further comprising:
a first transceiver; and
a second transceiver,
wherein the one or more processors are configured to enable one or more of the first transceiver and the second transceiver to be coupled to the selected one or more of the first antenna and the second antenna for communication with the another device.

13. A method comprising:
determining, by a device, a first metric according to a first data rate and a first power consumption of communication through a first antenna of the device;
determining, by the device, a second metric according to a second data rate and a second power consumption of communication through the first antenna and a second antenna of the device;
selecting, by the device, one or more of the first antenna and the second antenna for communication with another device, according to the first metric and the second metric; and
communicating, by the device through the one or more of the first antenna and the second antenna.

14. The method of claim 13, further comprising:
dividing the first data rate by the first power consumption to determine the first metric; and
dividing the second data rate by the second power consumption to determine the second metric.

15. The method of claim 13, further comprising:
comparing, by the device, the first metric and the second metric,
wherein the one or more of the first antenna and the second antenna for communication with the another device are selected, by the device, to support a higher one of the first metric and the second metric.

16. The method of claim 13, further comprising:
determining, by the device, a third metric according to a third data rate and a third power consumption of communication through the second antenna; and
comparing, by the device, the first metric, the second metric, and the third metric,
wherein the one or more of the first antenna and the second antenna for communication with the another device are selected, by the device, to support a higher one of the first metric, the second metric, and the third metric.

17. The method of claim 13, further comprising:
determining, by the device, a first signal strength of a first signal communicated through the first antenna;
determining, by the device, a second signal strength of a second signal communicated through the first antenna and the second antenna;
determining, by the device, the first data rate according to the first signal strength; and
determining, by the device, the second data rate according to the second signal strength.

18. The method of claim 17, further comprising:
determining, by the device, a third signal strength of a third signal received through the second antenna;
determining, by the device, a third data rate according to the third signal strength;
determining, by the device, a third metric according to the third data rate and a third power consumption of communication through the second antenna;
selecting, by the device, the first antenna and the second antenna for communication with the another device, in response to the first signal strength and the third signal strength being less than a threshold; and
selecting, by the device, the second antenna for communication with the another device, in response to i) the third signal strength being larger than the threshold and ii) the third metric being larger than the first metric and the second metric.

19. A non-transitory computer readable medium storing instructions when executed by one or more processors cause the one or more processors to:
determine a first metric according to a first data rate and a first power consumption of communication through a first antenna of a device,
determine a second metric according to a second data rate and a second power consumption of communication through the first antenna and a second antenna of the device,
select one or more of the first antenna and the second antenna for communication with another device, according to the first metric and the second metric, and
cause a transceiver to communicate through the one or more of the first antenna and the second antenna.

20. The non-transitory computer readable medium of claim 19, further storing instructions when executed by the one or more processors cause the one or more processors to:
divide the first data rate by the first power consumption to determine the first metric, and
divide the second data rate by the second power consumption to determine the second metric.

* * * * *